J. P. ROHAN.
LINE CONNECTOR.
APPLICATION FILED JAN. 18, 1921.
1,383,665.
Patented July 5, 1921.
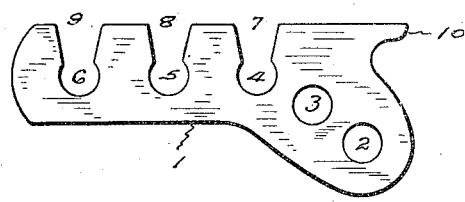
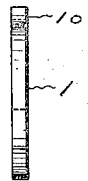
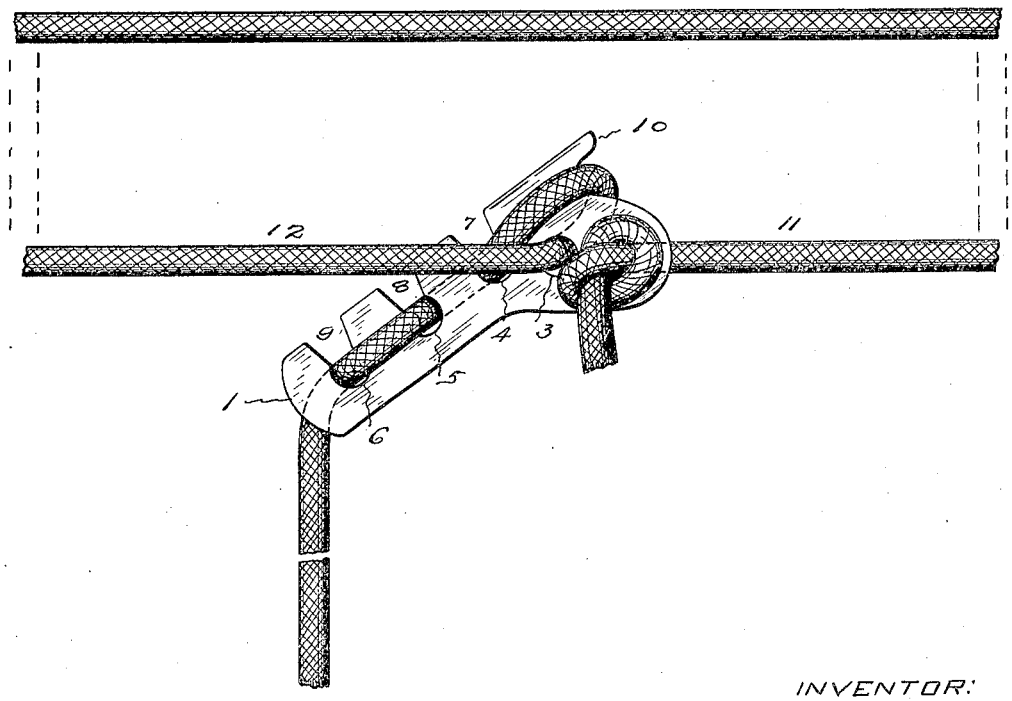
INVENTOR:
Joseph P. Rohan
BY
Harry P. Williams
ATTORNEY.

UNITED STATES PATENT OFFICE.

JOSEPH P. ROHAN, OF HARTFORD, CONNECTICUT, ASSIGNOR OF ONE-HALF TO MORRIS B. CARTIN, OF HARTFORD, CONNECTICUT.

LINE-CONNECTOR.

1,383,665.      Specification of Letters Patent.      Patented July 5, 1921.

Application filed January 18, 1921. Serial No. 438,202.

*To all whom it may concern:*

Be it known that I, JOSEPH P. ROHAN, a citizen of the United States, residing at Hartford, in the county of Hartford and State of Connecticut, have invented a new and useful Improvement in Line-Connectors, of which the following is a specification.

This invention relates to the construction of those devices which are used for connecting the ends of rope and cord, and more particularly for joining the ends of lines which are run about pulleys attached to distant supports for hanging clothes and the like articles.

The object of the invention is to provide a simple and cheap device of this character which can be easily manipulated for connecting, drawing taut and securely fastening together the ends of the line to be joined.

In the accompanying drawings Figure 1 shows a side view of a connector which embodies the invention; Fig. 2 is an end view of the same; Fig. 3 shows the device as in use for connecting the ends of a line.

The connector 1 which is a thin plate of metal may be cast to shape or stamped from sheet metal as desired. Near one end of the plate is a perforation 2. Adjacent to this perforation is a perforation 3. Along the plate are openings 4, 5 and 6, of substantially the size of the line with which the device is to be used. Tapering slots 7, 8 and 9 are made from the edge of the plate to the respective openings, the throat of the slots at their inner ends being narrower than the diameter of the openings with which they communicate. At the top of the perforated end of the plate is a horn 10.

One end 11 of the line is threaded through the perforation 2 and knotted to provide a permanent connection. The other end 12 of the line is drawn through the perforation 3 and when sufficiently taut is bent around the end of the plate under the horn to form a bight and then rove back and forth in the slots in the edge and pressed into the openings at the bottom of the slots. The end of a line manipulated in this manner will not loosen for it cannot be disengaged from the openings which are larger than the throats of the slots communicating therewith, and owing to the kinks resulting from the bending of the rope around the horn and through the openings it will not slip.

The invention claimed is:

A line connector comprising a metal plate having two perforations near one end, a horn projecting from the end adjacent to said perforations, and slots in one edge of the plate, said slots tapering inward and terminating in openings that are larger in diameter than the width of the throats of the slots.

JOSEPH P. ROHAN.